Aug. 28, 1962  R. A. WILKINS  3,050,848
METHODS OF MAKING INTERNALLY SLITTED STRIP MATERIAL
Filed Aug. 14, 1958  5 Sheets-Sheet 1
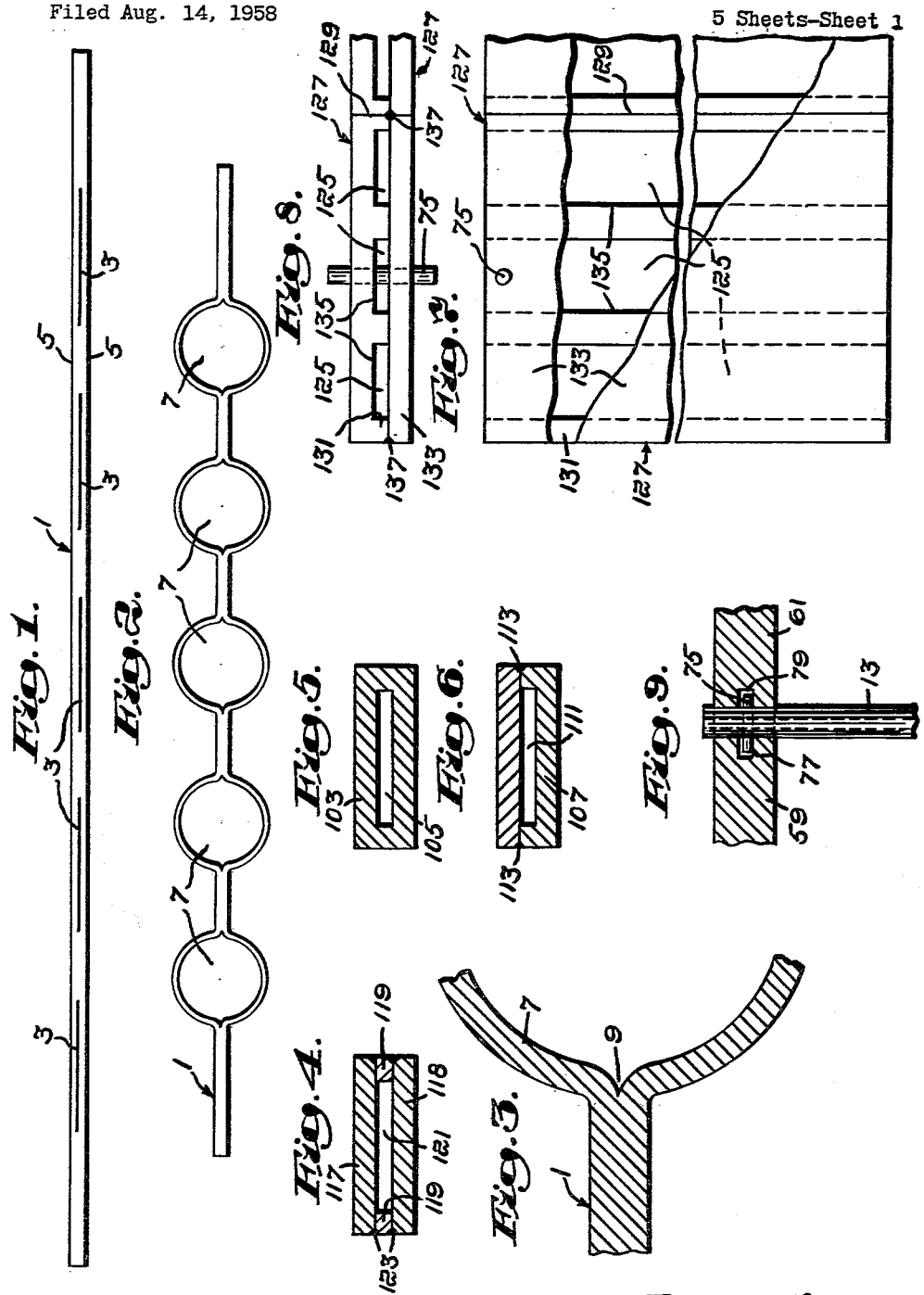
Inventor:
Richard A. Wilkins,
by Emery Booth Townsend
Miller & Weidner Attys Aug. 28, 1962 R. A. WILKINS 3,050,848
METHODS OF MAKING INTERNALLY SLITTED STRIP MATERIAL
Filed Aug. 14, 1958 5 Sheets-Sheet 2
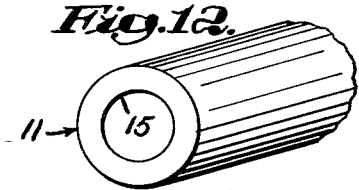
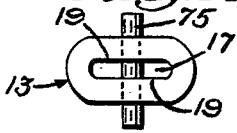
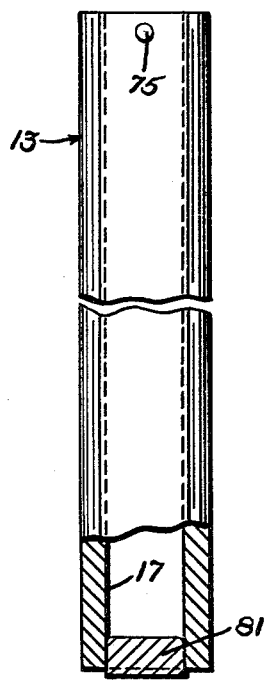
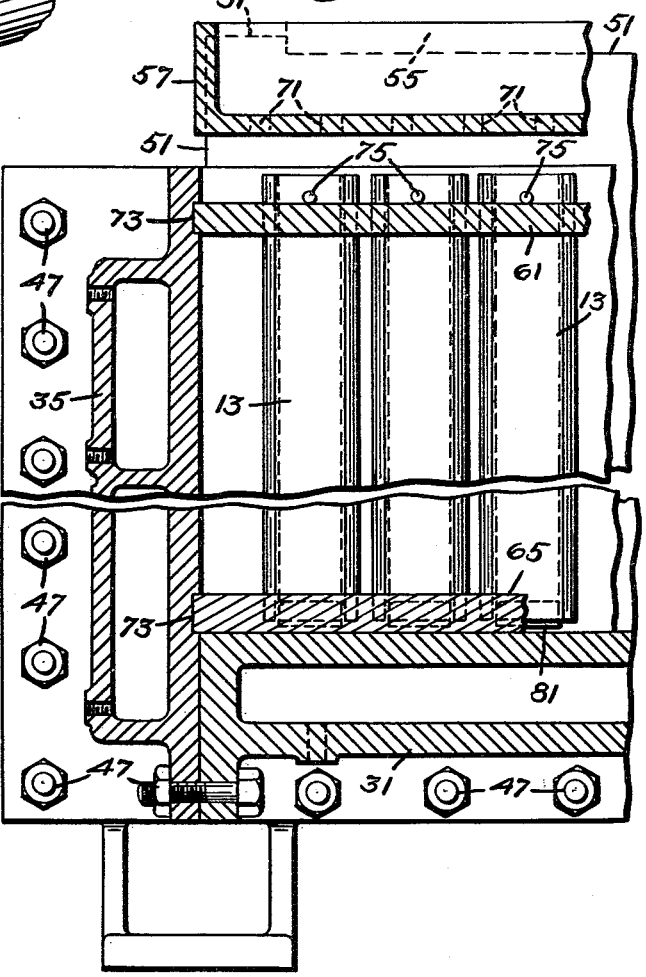
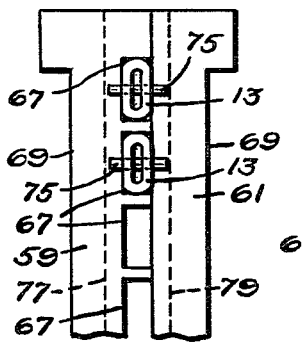
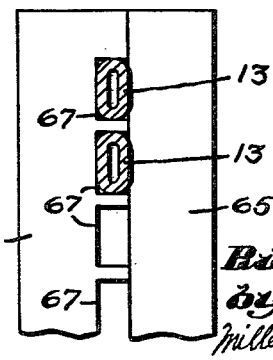

Aug. 28, 1962 R. A. WILKINS 3,050,848
METHODS OF MAKING INTERNALLY SLITTED STRIP MATERIAL
Filed Aug. 14, 1958 5 Sheets-Sheet 3
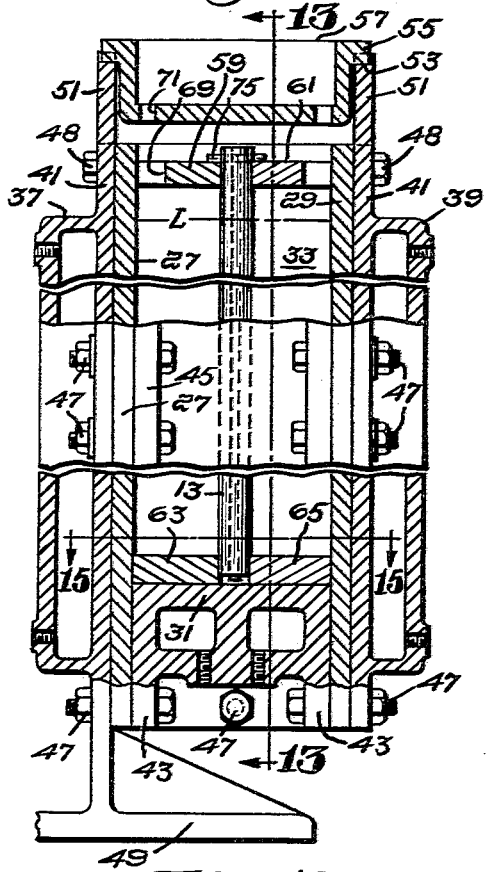
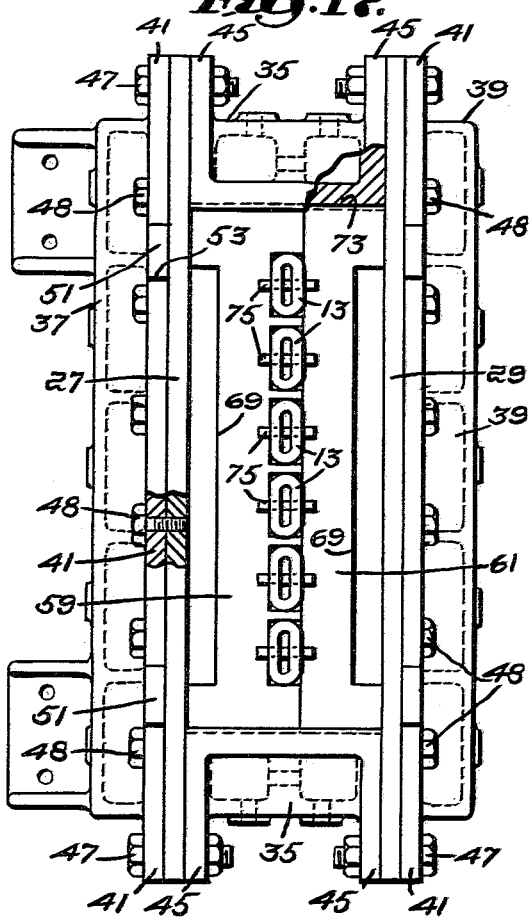
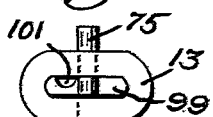
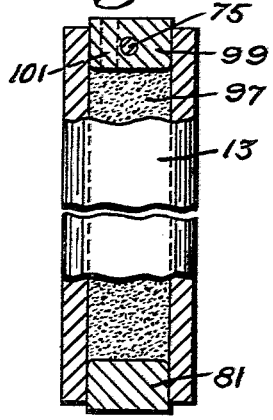
Inventor:
Richard A. Wilkins

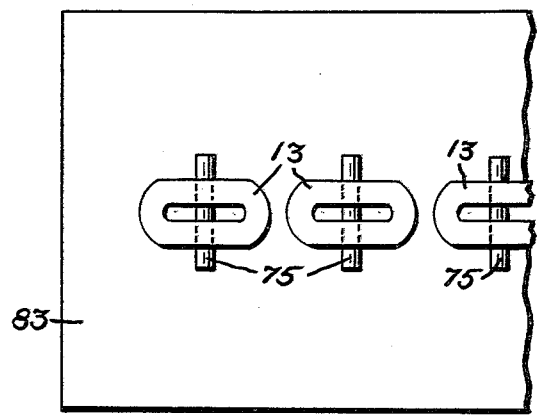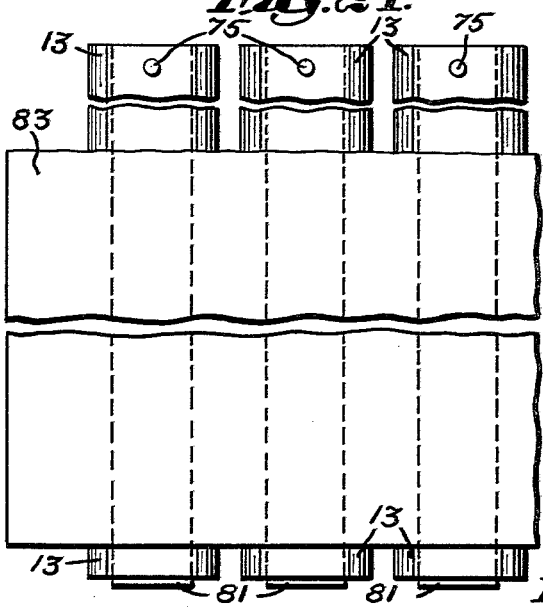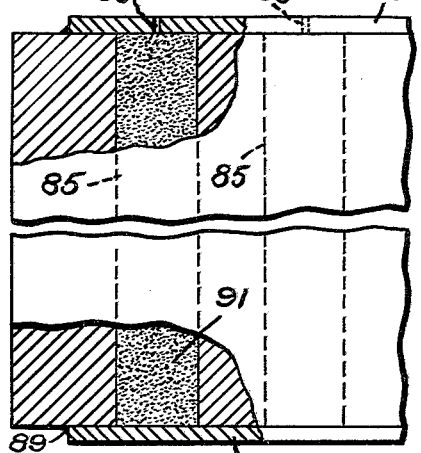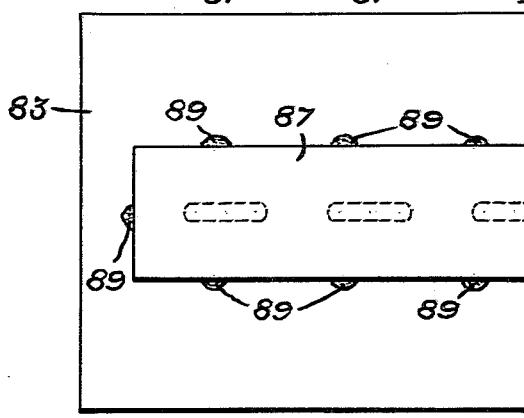

Aug. 28, 1962  R. A. WILKINS  3,050,848
METHODS OF MAKING INTERNALLY SLITTED STRIP MATERIAL
Filed Aug. 14, 1958  5 Sheets-Sheet 5
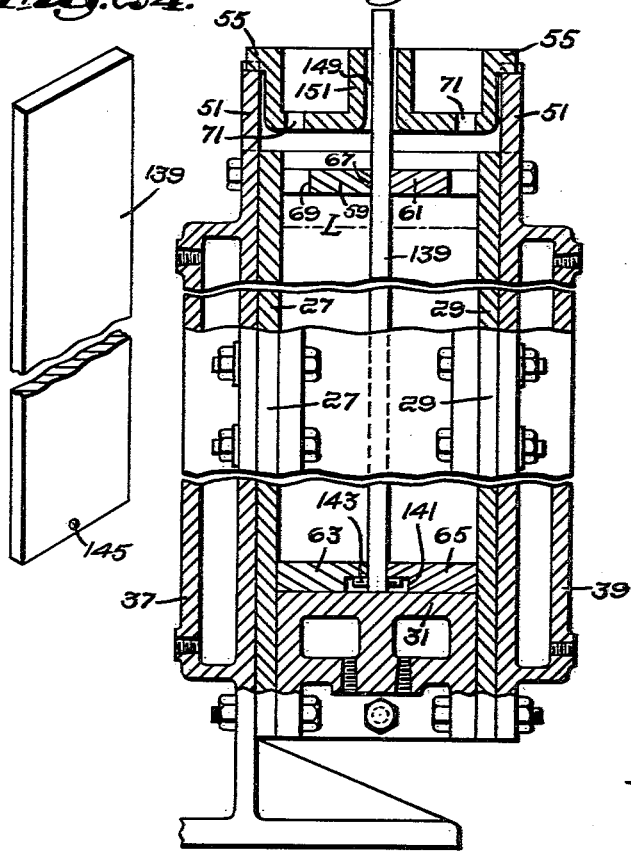
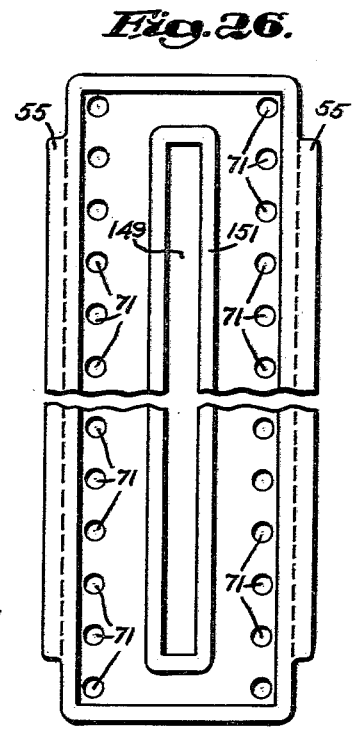
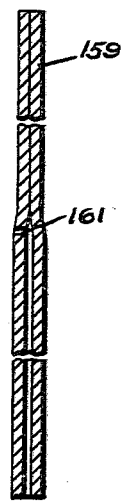
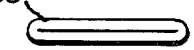
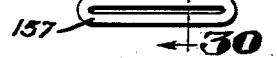
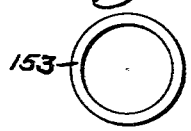
Inventor:
Richard A. Wilkins,
by Emery Booth Townsend
Miller & Weidner Attys

United States Patent Office 3,050,848
Patented Aug. 28, 1962

3,050,848
METHODS OF MAKING INTERNALLY SLITTED
STRIP MATERIAL
Richard A. Wilkins, Rome, N.Y., assignor to Revere
Copper and Brass Incorporated, Rome, N.Y., a corporation of Maryland
Filed Aug. 14, 1958, Ser. No. 755,847
4 Claims. (Cl. 29—528)

My invention relates to an improved method of making strip material having between its opposite faces one or more slits, which slits are capable of being expanded to form tubular passages, for example, by introduction thereinto of pressure fluid or by opening the ends of the slits and then forcing through them a plug of transverse cross-section that which it is desired the passage is to have, the present application being a continuation-in-part of my co-pending application Serial Number 707,522, filed January 7, 1958, and now abandoned in favor of the present application.

The present invention constitutes an improvement in the method, of making the slitted strip, disclosed by applicant's co-pending application Serial Number 518,768, filed June 29, 1955. According to the method disclosed by said application, the strip is formed by operations comprising casting the metal of a billet directly about elongated members of massive pulverizable weld preventing material, and rolling the billet to thin and elongate it and move the opposite faces of the spaces therein occupied by said members substantially into contact to form the slits, such rolling pulverizing the elongated members to a fine powder and spreading such powder along said spaces and slits.

It has been found in connection with the method disclosed by said application Serial Number 518,768 that to produce satisfactory results the elongated members, if the slits are to be in excess of about 5/16 inch wide, should be of flattened transverse cross-section so as to reduce to a minimum the amount of weld preventing material in the spaces of the billet occupied by them, that is to say, such members should be as thin as it is possible to make them. However, the attempt to employ members of such thinness results in rendering them so fragile that they are difficult to handle, and install in the molding apparatus employed for casting the billet, without their rupturing, thus requiring great care, with resulting high labor costs, in handling them and so installing them. Furthermore, it has been found that the members formed of most massive materials, for example graphite and soapstone, can be produced only at considerable expense when they are of such thinness and are not always obtainable particularly when they are to be of long enough length to permit economic operations in producing the slitted strip, these factors making it least expensive, and often necessary, to form such members of powdered weld preventing material bonded together with a heat refractory binder such as Portland cement or calcium aluminate, but the members so formed are likewise undesirably fragile making them in many cases unsatisfactory in respect to the cost of producing the slitted material despite the weld preventing material in powder form commonly being relatively inexpensive.

According to the present invention, the above defects are avoided by forming the passages for the weld preventing material in the billet by casting the metal about elongated tubes having bores of flattened transverse cross-section, or by casting the metal about elongated rods of flattened cross-section and of such characteristics with respect to the cast metal that they may be withdrawn from the billet to leave passages, the bores of the tubes or the passages left by the withdrawn rods being charged with the weld preventing material in powder form prior to subjecting the billet to the rolling operation.

The above and other objects of the invention will, however, be best understood from the following description of several ways of performing the method according to the invention when read in the light of the accompanying drawings, while the scope of the invention will be more particularly pointed out in the appended claims.

In the drawings:

FIG. 1 is an end view of one form of slitted strip produced by a method according to the invention;

FIG. 2 is an end view of the strip according to FIG. 1 with the slits inflated to their maximum extent possible without stretching the walls of the passages formed by such inflation;

FIG. 3 is a transverse cross-sectional view of a fragment of one of the passages of the inflated strip according to FIG. 2, on an enlarged scale;

FIGS. 4, 5 and 6 are, respectively, transverse cross-sectional views of different forms of tubes for use in the method according to the invention;

FIG. 7 is a side elevation, with parts broken away, of a further form of tube according to the invention;

FIG. 8 is an end view of the form of tube shown by FIG. 7;

FIG. 9 illustrates a detail;

FIG. 10 is an elevation, with parts broken away, of a still further form of tube for use in the method according to the invention;

FIG. 11 is an end view of the tube according to FIG. 10;

FIG. 12 is an isometric view of a fragment of a tube employed in producing the tube according to FIGS. 10 and 11;

FIG. 13 is a section on the line 13—13 of FIG. 16, with parts broken away;

FIGS. 14 and 15 illustrate details, FIG. 15 being a section on the line 15—15 of FIG. 16, with parts omitted and parts broken away;

FIG. 16 is a side elevation, with parts broken away and parts in section, of a fixed mold having tubes according to FIGS. 10 and 11 installed therein for use in casting the billet employed in the method according to the invention;

FIG. 17 is a plan of the mold according to FIGS. 13 and 16;

FIG. 18 is a side elevation, with parts broken away and parts in section, of another form of tube for use in a method according to the invention;

FIG. 19 is an end view of the tube according to FIG. 18;

FIG. 20 is a plan of a fragment of the billet cast in the mold according to FIGS. 13, 16 and 17 employing the tubes according to FIGS. 10 and 11;

FIG. 21 is a side elevation, with parts broken away, of the fragment of the billet according to FIG. 20;

FIG. 22 is a side elevation, with parts broken away and parts in section, of a fragment of the billet according to FIGS. 20 and 21 after being operated upon to prepare it for subjecting it to the rolling operation;

FIG. 23 is a plan of the fragment of the billet according to FIG. 22;

FIG. 24 is an isometric view of a metal strip for use in a modified form of practice of the invention;

FIG. 25 is a view, corresponding to FIG. 16, of a mold having therein the strips according to FIG. 24;

FIG. 26 is a plan of the pouring box according to FIG. 25;

FIG. 27 is an end view of another form of metal strip for use in the practice of the invention;

FIG. 28 is a bottom view of the strip according to FIG. 30;

FIG. 29 is an end view of a metal tube from which the strip according to FIG. 27 and the strip according to FIGS. 28 and 30 may be formed; and FIG. 30 is a section on the line 30—30 of FIG. 28, with parts broken away.

Referring particularly to FIGS. 1 to 23 of the drawings, the strip 1 (FIG. 1) is shown as provided with a row of spaced slits 3 between its opposite faces 5. These slits extend longitudinally of the strip from one of its ends to its opposite end. The slits may be inflated, permamently to expand them, without the use of a die or other form to produce the article according to FIG. 2 having the parallel row of passages 7. Such inflation may be done by temporarily closing one end of each slit by use of a clamp, expanding the opposite end for a short distance inwardly of that end by use of a suitable tool, inserting a nozzle in such expanded portion, and introducing pressure fluid into the slit by way of such nozzle, the pressure of such fluid being such as to expand the slit to its maximum extent without stretching the walls of the passages so formed, in other words, to cause the passages to be of circular transverse cross-section except at diametrically opposite sides thereof where their walls join the unslitted portion of the strip, at which points are formed the longitudinally extending wedge-shaped recesses indicated at 9 in FIG. 3.

It has been found that because of the wedge-shaped recesses 9 when the slits lie midway the thickness of the strip or thereabout, as will be the usual case in commercial practice, the inside diameter of each passage 7 is for all practical purposes that of a circle whose circumference is twice the difference between (a) the width of the corresponding slit and (b) the thickness of the strip. In such instance the center lines of adjacent passages will be spaced apart the distance the center lines of the corresponding slits are spaced apart less a distance which is the difference between (a) one-half the sum of the widths of said slits and (b) the sum of the thickness of the strip and one-half the sum of the diameters of said passages. In producing such a strip there may be readily computed from these formulas the widths of the slits and their spacings necessary to enable passages to be produced of given diameters and spacings whether the passages are to be of the same diameter or different diameters and whether or not they are to be uniformly spaced.

It will be understood that the thicknesses of the slitted strips are in no way critical, although commonly such thicknes will not exceed about 0.2 inch and usually in commercial practice will be much less, say for the most part not over about 0.06 inch all the way down to the neighborhood of 0.006 inch for stock for use in producing some forms of heat exchangers. Also it will be understood that the thickness of the layers of residual weld preventing material in the slits is not critical. Such thickness will depend upon the extent to which a given billet is reduced by the rolling operation. In any ordinary case it will be very thin, commonly not exceeding about 0.0002 inch in thickness and even much less, in other words, from a geometrical standpoint such layers will be practically non-existent.

Preferably each tube about which the billet is cast is formed by rolling a relatively thick walled metal tube of circular transverse cros-section, such as the tube indicated at 11 (FIG. 12), to flatten it without elongating it to produce a so-called "oval" tube such as that indicated at 13 (FIG. 11). The diameter of the bore 15 of the circular tube selected is less than the width of the slit to be formed in the slitted strip, such tube being flattened to such extent as to cause the bore 17 of the oval tube produced to be of the width of such slit. The bore of the so-called oval tube 13 has the opposite flat faces 19. The distance between these faces is not critical, but to produce best results should be as small as possible consistent with providing sufficient space to permit the weld preventing powder to be entered into the passage formed by the bore of such tube. Commonly such distance need not exceed about ⅛ inch. For economic reasons a long tube having the circular transverse cross-section of the tube 11 may be rolled to produce a tube having the transverse cross-section of the oval tube 13, and such oval tube severed into shorter lengths each requisite for producing the billet.

As will be obvious, the bore of the so-called oval tube could be made actually geometrically oval by employing grooved rollers for rolling the circular tube from which it is produced, but there would be little point in doing this as it would only result in its being necessary to charge such bore with more weld preventing material than would otherwise be necessary or desirable, it being among the objects of the present invention to employ as little weld preventing material as feasible.

The metal of the billet may be cast about the empty tubes 13 while positioned in the fixed mold according to FIGS. 13 to 17, or while being fed vertically downward into the chilled ring of continuous casting apparatus having below such ring a vertically descendable platen, such as the continuous casting apparatus described in applicant's co-pending application Serial Number 650,133, now Patent No. 2,950,512, filed April 2, 1957.

The fixed mold according to FIGS. 13 to 17, except for the specific way in which the tubes are supported therein according to the present invention, is more fully described in applicant's above mentioned co-pending application Serial Number 518,768. As in general the specific construction of such mold does not form part of the present invention such construction will not be described herein with any more particularity than is necessary to explain how the mold is employed in connection with that invention.

Referring to FIGS. 13 to 17, the fixed mold illustrated comprises the opposite face plates 27 and 29 between which at their opposite lower edge portions is placed the water jacketed member 31 forming the bottom of the open top mold chamber 33, and between which at their opposite vertical edge portions are placed the water jacketed members 35 forming the edges of that chamber. As shown, the face plates 27 and 29 are backed by the water jacketed members 37 and 39, respectively. These members 37 and 39 are each shown as provided with the peripheral flanges 41, and the members 31 and 35 with the peripheral flanges 43 and 45, respectively. Through aligned perforations in these flanges and those portions of the face plates 27 and 29 which lie between the flanges removably extend bolts 47. At the top of the mold those portions of the uppermost horizontal flanges 41 of the members 37 and 39 which are intermediate the bolts 47 at the ends of such horizontal flanges, as viewed in FIG. 17, are secured to the face plates 27 and 29 by tap bolts 48 extending through perforations in said flanges and tapped into the face plates. The backing member 37 at the left of the mold, as viewed in FIG. 16, is shown as provided with feet 49 that may rest upon and be bolted to a suitable support (not shown) for the mold. By removing the bolts 47 securing the member 39 and face plate 29 to the rest of the mold that member and face plate may be removed from the rest of the mold for opening the mold chamber to permit removal therefrom of the billet after it is cast. As illustrated, the uppermost flanges 41 of the members 37 and 39 are provided with upwardly extending portions 51 formed on their upper edges with notches 53 which removably receive the outwardly projecting lugs 55 of a removable pouring box 57.

When the vertical mold chamber 33 is opened by removal of the pouring box 57, face plate 29, and water jacketed member 39, in the way above described, the tubes 13 may be placed in such chamber, whereupon the face plate, water jacketed member and pouring box may be replaced and the mold poured to cast the metal about the tubes so as to form the billet, which latter may be removed by again opening the mold chamber.

As shown, for supporting and properly spacing the tubes in the mold chamber there are provided at the top of the mold chamber a pair of plates 59 and 61 and at the bottom of the mold chamber a pair of plates 63 and 65, the two last mentioned plates resting upon the upper surface of the bottom member 31 of the mold. The plates 63 and 65 are formed of heat refractory material insoluble and otherwise inert with respect to the molten metal poured into the mold. For copper and copper-base alloys, and aluminum and aluminum-base alloys, such material may, for example, be graphite, while for nickeliferous and ferrous metals it ordinarily may be stainless steel or other steel alloy of high melting and softening temperatures. There is, however, not much tendency of the plates 63 and 65 to melt or soften because of such plates being chilled by the water jacketed mold member 31 on which they rest. As the mold is poured to about a level L (FIG. 16) the molten metal does not contact the upper plates 59 and 61, and such plates therefore may be made of graphite or metal of high heat refractoriness regardless of the kind of metal poured into the mold.

As shown, the plates 59 and 61 abut at their longitudinally extending edges adjacent the longer central vertical plane of the mold chamber, as do likewise the plates 63 and 65. The edge of the plate 59 abutting the edge of the plate 61, and likewise the edge of the plate 63 abutting the edge of the plate 65, is formed with a row of spaced notches 67 for receiving the adjacent end portions of the tubes so as to hold them vertically in proper spaced relation. The outer edge portions of the plates 59 and 61 are each shown as formed with a long notch 69 positioned below the discharge opening 71 of the pouring box so that the molten metal discharged through said opening may freely enter the mold chamber. As shown, the end edges of the plates 59, 61, 63 and 65 are removably and slidably received in grooves 73 formed in the edge members 35 of the mold so that when the mold is opened the plates and tubes may be readily assembled preparatory to pouring the mold and so that the plates 61 and 65 may be readily slid from the mold chamber with the billet when the latter is being removed from said chamber.

The tubes are slidably supported for vertical movement in the openings formed by the notches which receive them. Preferably they are suspended from the plates 59 and 61 to insure against their buckling under their own weight if very much softened by the molten metal poured into the mold. For such purpose each tube 13 at its upper end portion may be provided with a cross pin 75 the ends of which project from the tubes and rest on the upper surfaces of these plates, the lower end portions of the tubes being spaced from the upper surface of the bottom member 31 of the mold. When the tubes are of the same metal as the metal poured into the mold, or of a heavier metal, there will be no tendency of the tubes to float upward in the molten metal. However to insure against any possibility of this occurring, or when the tubes are of a metal which is less dense than a different molten metal poured into the mold, the plates 59 and 61 may be formed at their abutting edges with longitudinally extending grooves 77 and 79 (FIGS. 9 and 14), which grooves lie at the opposite sides of the openings in the assembled plates receiving the tubes and receive the projecting end portions of the several pins 75.

In any usual case molten metal will not flow into the tubes through their lower ends by way of the spaces between the corners of the openings formed by the plates 63 and 65 and the curved edges of the tubes. Metal flowing into those spaces ordinarily will quickly freeze and therefore close such spaces. However, to insure against any possibility of the molten metal flowing into the tubes through their open lower ends said ends may be closed prior to installing them in the mold, say by driving into their bores at their lower ends a plug 81 (FIGS. 10 and 13). The lower end portions of the tubes will project from the lower end surface of the billet defined by the upper surfaces of the plates 63 and 65. Preferably the plugs are of such length that they will not extend into the passages in the billet formed by the bores of the tubes so that when the lower projecting end portions of the tubes are cut off the plugs will be removed with them.

When the tubes are of the same metal as that poured into the mold, or otherwise have a melting temperature not higher than the temperature of such poured metal, the tubes will be melted inwardly from their outer surface to fuse or mix with the poured metal. To prevent the tubes being perforated their wall thicknesses should be such that they are melted inwardly only for part of that thickness. The thickness of the tube walls necessary to secure this result for any given temperature of the poured metal and the time it takes it to cool in the mold to below the melting temperature of the tube metal will of course depend on the condition of the outer surfaces of the tubes and the thermal conductivity, specific heat, and latent heat of the tube metal. Ordinarily satisfactory results in this respect will be secured when the tube walls are from ⅛ to ¼ inch in thickness. The metal may be poured into the mold chamber at a rate in accordance with common foundry practice in casting billets to be subjected to a rolling operation for producing strip, which rate would fill a mold chamber about 5 feet high to the desired level in about 30 seconds. The metal may be so poured at a temperature in accordance with ordinary foundry practice, but preferably at a temperature at the lower part of the permissible range of pouring temperatures for the given metal being poured, for example a pouring temperature of about 2100° F. for copper, that is to say, about 150 to 200° above the liquidus temperature of such metal. By employing a relatively low pouring temperature assurance is had that the tube walls will not be unduly melted at the center and top portions of the mass of metal in the mold chamber, at which portions the metal cools more slowly than at other portions of such mass.

For further insuring against undue melting of the tube walls during the casting operation they may be and preferably are coated, prior to installing them in the mold, with a thin layer of dissipatible insulating material for delaying or retarding the melting action of the poured molten metal on them. Any of the conventional mold dressings usually employed when casting the poured metal may be employed for this purpose. Such mold dressings may be applied, as a paint, to the exterior surfaces of the tubes by use of a brush or paint sprayer. For example, the mold dressing employed when casting aluminum and aluminum-base alloys is commonly compounded of Spanish chalk (calcium carbonate), water, and water glass (sodium silicate) in the proportions of 6 pounds Spanish chalk, 5 gallons water, and 2 pounds water glass, the chalk in powder form being stirred into the water while bringing the latter to a boil, whereupon the heating is discontinued, the water glass stirred into the hot mixture, and the final mixture again brought to a boil and then permitted to cool. As a further example, the mold dressing ordinarily employed when casting cooper and copper-base alloys is commonly bone ash mixed into an alcohol solution of ordinary rosin, from which mixture the bone ash may, if desired, be omitted, and preferably is omitted in the practice of the present invention, sufficient rosin being employed to make the solution capable of being applied like ordinary paint.

The layer of insulating material may be applied to the tubes at their outer surfaces at the portions thereof only which are most strongly tended to be melted by the molten metal poured into the mold chamber. Otherwise, and most conveniently, it may be applied to the entire outer surfaces of the tubes. The solid particles of these coatings, for example the powdered Spanish chalk, bone ash, or char to which constituents of the rosin may be reduced, will for the most part float to the upper surface of the molten metal in the mold. Any of such particles as remain in the poured metal will lie adjacent the passages in the billet and will be so dissipated by the subsequent rolling operation on the billet as to have no observable effect on the characteristics of the metal. At any portions of the billet where the tubes are not melted by the metal poured into the mold chamber, which portions sometimes may exist toward the extreme lower end of the billet, the subsequent hot rolling operation on the billet will weld those portions of the tubes to the metal surrounding them.

When the melting temperature of the tube metal is higher than the temperature at which metal is poured into the mold, as may be the case when the tubes are of a different metal from the metal so poured, the tube walls will of course not melt. In such case, however, the subsequent hot rolling operation on the billet will weld the metal of the tubes to the metal surrounding them. Preferably the outer surfaces of the tubes in this case are coated, prior to installing them in the mold, with a thin layer of flux to promote such welding. Practicablly any welding compound commonly employed for welding the metals presented in this instance may be employed for the purpose if of such consistency that they may be readily applied to the tubes as a paint. The excess of such flux will float to the surface of the molten metal during the casting operation, and any that remains on or adjacent the tube walls will be so dissipated by the subsequent rolling operation as to have no observable effect on the characteristics of the metal or metals of the final strip.

When the billet 83 made as above described is removed from the mold it will be in the form indicated by FIGS. 20 and 21, the end portions of the tubes 13 projecting from its upper and lower end surfaces. These projecting portions may then be cut off, together with sufficient of the portion of the billet at its extreme top necessary to remove any dross which may have collected at such top portion and any piping that may exist therein. This will leave the billet with a row of passages 85 therein extending longitudinally thereof and the same transverse cross-sectional size and shape as the bores of the tubes.

After the billet is so prepared a closure may be applied to the lower ends of the passages 85 in the billet, say by use of a metal strip 87 extending over the openings of the passages on the lower surface of the billet and secured thereto by welding, preferably tack welding, as indicated at 89 (FIGS. 22 and 23). After this closure 89 is so applied each passage 85 may be charged with a body 91 of the powdered weld preventing material, whereupon the upper ends of the passages may be closed, say by applying a second strip 93 to the upper end surface of the billet, this second strip being identical with the other strip 87 and secured to the billet in the same way.

The weld preventing powder may be poured into the passages 85 by use of a funnel or the like, preferably completely to fill said passages, ramming the material in the passages downwardly in cases where it does not flow freely. One of the most suitable substances for this powder is alumina ($Al_2O_3$) at it flows very freely in powder form. Other substances which may be employed for the powder are zinc oxide, magnesia (MgO), boron nitride, china clay, aluminum silicate, and titanium oxide ($TiO_2$), all of which, like magnesia, are chemically inert in respect to commercial metals of which the tubes may be formed at the hot rolling temperatures of the billet and stable at such temperatures. When the particular metal of the tubes is aluminum or aluminum-base alloy the material of the powder may be talc or quartz, and when such metal is copper or copper-base alloy the material may be graphite, which materials are chemically inert in respect to these particular metals at hot rolling temperatures of the billet and stable at such temperatures.

Completely filling the pasages 85 of the billet with the powdered weld preventing material minimizes the amount of air included in the passages. Preferably at least one of the strips 87 and 93 is formed with through passages 95, say through passages of about 1/16 inch diameter, in registry with the passages 85 for venting the latter when the billet is being heated to hot rolling temperature. Such vents will permit the escape from the passages 85 during such heating of the billet of water vapor from moisture included in the masses of powder and of included and occluded air and other gases.

After the billet is heated to hot rolling temperature it is presented at that temperature to the rolls of a mill for thinning and elongating it. The reduction effected by the initial pass of the billet through the rolls preferably is such as to thin it enough to move the opposite faces of the passages 85 into such close proximity that the powder will be so compacted that no air can enter the passages from outside the billet when the closure strips 87 and 93 drop from the billet during such pass, the tack welding of these strips to the billet readily permitting their separation from the billet when the latter is so reduced in thickness. Any excess amounts of weld preventing powder contained in the passages will be squeezed out of them when these cover strips drop off. During the final part of the hot rolling operation opposite faces of the passages 85 will be brought substantially into contact to form slits. Subsequent to the hot rolling operation the billet may be further reduced to the gauge of the final slitted strip by cold rolling. These hot and cold rolling operations may be performed in accordance with usual mill practice in producing thin gauge strip from thick billets.

The above described method constitutes the preferred form of the invention. However it is possible, but ordinarily with less facility and at greater labor and other costs, to charge the tubes with the weld preventing powder prior to installing them in the mold. A tube so charged is illustrated in FIGS. 18 and 19. In such case a closure will be applied to the lower end of the bore of the tube, for example a closure in the form of the plug 81 driven into such lower end. With the plug 81 in place the tube will be charged through its upper open end with the body 97 of weld preventing powder, whereupon a closure will be applied to such open end, which closure for example may be in the form of a plug 99 driven into such end. This plug 99 is shown as formed with an exterior groove 101 which serves as a passage for venting the bore of the interior tube. As shown, the pin 75 for suspending the tube in the mold extends through aligned perforations in the tube wall and said plug.

When employing the tube according to FIGS. 18 and 19 the vent afforded by the groove 101 will permit escape of water vapor, air and gases from the mass of material in the bore of the tube when the latter is heated by the hot metal poured into the mold. After the billet is cast and removed from the mold it may be placed in a vertical position with the plugs 99 uppermost, and the portions of the tubes projecting from its upper end, together with sufficient of the upper portion of the billet necessary to remove dross and any piping that may be in the billet, cut off. Whereupon the closure strip 93 (FIG. 22) may be applied, after which the billet may be reversed to place the plugs 81 uppermost and the adjacent projecting ends of the tubes cut off and the closure strip 87 applied. However in such case it will not ordinarily be necessary to form either closure strip with the vent passages 95 as the bodies of weld preventing material in the passages 85 of the billet will be sufficiently vented when the tubes are heated by the molten metal poured into the mold chamber.

The tubes may be formed otherwise than as above described. For example, when the tube metal is capable of being extruded such as are aluminum, copper and their alloys, the tube may be formed by extrusion. Conveniently the tube so formed, including its bore, may be of rectangular transverse cross-section, as indicated by the tube 103 (FIG. 5) having the bore 105.

Where continuous walled tubes of the desired transverse cross-sectional size and shape cannot be readily obtained, as may often be the case with for example stainless steel tubes, such tubes may be formed in the way indicated by FIG. 6. According to that figure such tube comprises a lower strip 107 on which is superimposed an upper strip 109. At least one of these strips, and preferably but one, is formed, by extrusion, rolling or machining depending upon the particular metal employed and available facilities, adjacent the interface of the strips with a groove 111 to provide the bore of the tube formed by the superimposed strips. These strips at their exterior edges may be secured together by welding, as indicated at 113, preferably tack welding. Those portions of the interface of the strips adjacent their opposite edges not melted during the casting operation will be welded together during the hot rolling operation on the billet.

Also the tube may be formed of four strips, as indicated in FIG. 4. These strips, as shown, comprise a lower strip 115 and an upper strip 117, between which strips adjacent their opposite edges are placed the strips 119 to provide the bore 121 of the tube formed by welding together the interfaces of the strips at their outer edges as indicated at 123, such welding preferably being tack welding. As in the case of the strips shown by FIG. 6, those portions of the interfaces of strips at the opposite edge portions of the tube not melted during the casting operation will be effectively welded together during the hot rolling operation.

It will be understood that with any of the tubes hereinbefore described the minimum distance between adjacent edges of adjacent slits in the slitted strip is that which is secured by placing in contact the adjacent outer vertical edges of adjacent tubes. With so contacting tubes having the rounded edges of the tubes 13 (FIGS. 10 and 11) the molten metal poured into the mold will flow into the spaces between such edges to their vertical line of contact, any separation of the metal at opposite sides of such line being corrected by such metal welding together during the hot rolling operation. With tubes having the flat edges of the tubes shown by FIGS. 4, 5 and 6 any portions of the outer surfaces of the contacting edges of such tubes not melted by the poured metal likewise will be welded together during the hot rolling operation.

When the passages in the billet are to be placed closer together than the sum of the wall thickness of the edge portions of adjacent tubes the tube may have the multiple bores 125 of the tube 127 of FIG. 8, and if there are to be more passages in the billet than the number of bores in such tube a number of the tubes requisite to provide such number of passages may be employed with the adjacent edges of adjacent tubes in contact as indicated at 129 (FIG. 8), in which case the sum of the wall thicknesses separating the tubes adjacent their contacting edges may be equal to the desired spacing of those tubes. The tube may comprise the superimposed flat strips 131 and 133 in at least one of which, and preferably in one only, are formed the spaced grooves 135 that constitute the bores 125 of the tube formed by the superimposed strips. These strips when superimposed may be welded together at their opposite edge portions, as indicated at 137, preferably by tack welding. When the billet is hot rolled the strips of which the tube is formed will be welded together the remaining portions of their interface at each of opposite sides of the grooves, as likewise will be welded together any portions of the abutting edges of the tubes.

Applicant has found that in instances of billets of certain metals smooth walled passages of uniform transverse cross-sectional size and shape throughout their lengths to be charged with the weld preventing powder may be successfully and inexpensively cored in the billet by casting the billet about elongated strips of metal having particular characteristics relative to those of the metal cast and, after the billet has cooled, withdrawing such strips.

Although it might be possible to core passages in these and many other instances by tapering the strips from one end thereof to the other, the machining and grinding of the strips to so taper them involve such expense as, if for no other reason, to render the use of them prohibitive, and furthermore, and most importantly, if the strips are tapered the passages cored by them likewise will be tapered and thus not be of uniform transverse cross-sectional size and shape throughout their lengths.

Applicant has found, however, that the elongated core members in the form of metal strips of uniform transverse cross-sectional size and shape throughout their lengths may be successfully employed by selecting those which have a melting point higher than the temperature at which the billet metal is poured into the mold so that the strips at their surface portions will not melt, and further have an average coefficient of thermal linear expansion greater than that of the metal of the casting for a temperature difference corresponding to the cooling of the billet to room temperature from the solidus temperature of the metal cast so as to minimize the tightness of the fit of the strip in the casting caused by shrinkage of the cast metal in solidifying whereby to permit withdrawal of the strips lengthwise from the billet under forces less than those which will stress the strips to their yield points, all this provided the strips are of such transverse cross-sectional area relative to the mass of the casting and are of metal of such specific heat and thermal conductivity that when the poured metal cools to its solidus temperature the strips will be at substantially the same temperature.

Preferably, in employing elongated core members having the above described characteristics relative to those of the casting, the billet is formed by casting the metal in the vertical mold chamber of a fixed water cooled mold, or by casting it in continuous casting apparatus hereinbefore described, with the core members positioned vertically. In the case of the fixed mold, positioning the core members vertically prevents them from bowing laterally due to their specific gravity being less than that of the poured metal, and, because the metal poured into the mold chamber rapidly and progressively cools as that chamber is being progressively filled, prevents such warping of the casting as tends to occur as the cast metal shrinks in solidifying from displacing said members.

Applicant has found that copper, alpha brasses, carbon steel, cupro-nickel containing approximately 20 to 30% nickel, and certain nickel-base alloys such as Monel metal, all of which are suitable as the metal of the internally slitted strip, may be successfully used in combination with elongated core members of austenitic stainless steels of the American Iron and Steel Institute so-called Class III (or 300 Series) specifications, all of which are characterized by a low carbon content and high nickel and chromium contents, and all of which have a coefficient of thermal linear expansion greater than that of any of these billet metals for a temperature difference corresponding to the cooling of the cast billet metal to room temperature from its solidus temperature.

Copper, for example, has an average coefficient of thermal linear expansion for such temperature difference of about 9.8 microinches per inch per degree Fahrenheit, while these stainless steels for the same temperature difference have a higher average coefficient of thermal linear expansion in the range of 10.6 to 11.4 microinches per inch per degree Fahrenheit.

The stainless steels mentioned have a carbon content not exceeding approximately 0.2% and in the instance of some of them a much lower carbon content, a chromium content of approximately 16 to 20%, and a nickel content of approximately 6 to 11%. Examples of these stainless steels are so-called No. 301 which contains 0.08 to 0.2% carbon, 16 to 18% chromium, 6 to 8% nickel, and up to 2% manganese No. 302 which contains 0.08 to 0.2% carbon, 17 to 19% chromium, 8 to 10% nickel, and up to 2% manganese No. 302B which contains 0.08 to 0.2% carbon, 17 to 19% chromium, 8 to 10% nickel, up to 2% manganese, and 2 to 3% silicon No. 303 which contains up to 0.15% carbon, 17 to 19% chromium, 8 to 10% nickel, and a small fraction of a percent of selenium No. 304 which contains up to 0.08% carbon, 18 to 20% chromium, 8 to 11% nickel, and up to 2% manganese.

All of these stainless steels have an average coefficient of thermal linear expansion of about 11.2 microinches per inch per degree Fahrenheit for a temperature difference of 68 to 1825° F.

Another alloy which applicant has found suitable for use as the core members for billets of the same metals as those for which the above mentioned austenitic stainless steels are suitable is so-called Hastelloy D alloy which nominally consists of approximately 87% nickel, 10% silicon, and 3% copper.

It will be understood that it is common practice to coat the surfaces of a mold chamber, in which a metal is to be cast, with a suitable mold dressing, such as that hereinbefore described, to insure against sticking of the casting to those surfaces so as to insure that the casting may be readily removed from the chamber without tearing of the surface of the casting. Likewise in employing the metal core members they may be advantageously coated with the mold dressing to insure that the cast metal will not stick to them and thus enable them to be withdrawn from the casting under forces which will not stress them to their yield points and without tearing the surface metal of the passages in the casting left by such withdrawal.

In the practice of the invention the elongated core members, such as the strips 139 (FIG. 24), may be positioned in a fixed mold into which the metal of the casting is substantially poured to a level L (FIG. 25) to form the billet. This mold may be identical with that shown by FIGS. 13 to 17 except for the pouring box and in that the plates 63 and 65 at their abutting edges are formed at their under sides each with a groove 141 which receives the projecting end portions of a readily removable pin 143 extending through a hole 145 (FIG. 24) in the lower end portion of each strip. These pins prevent any possibility of the strips floating upward in the molten metal during the casting operation. The strips so that they may readily expand linearly slidably fit the openings formed by the notches 67 (FIG. 14) formed in the inner longitudinally extending edge portion of the plate 59.

As clearly indicated in FIG. 25, the elongated core members rest at their lower ends on the upper surface of the mold bottom member 31 and at their upper ends extend to well above the level to which the mold is to be poured so as to extend correspondingly above the upper surface of the billet and thus form extensions which may be gripped by the instrumentality that pulls them from the billet. To permit this upward extension of the core members the pouring box 147 is formed with a vertical opening 149 through which said members extend, this opening being surrounded by a continuous vertical wall 151 of the height of the pouring box.

The elongated members 139 are shown as of oblong, transverse cross-section of corresponding size and shape to the bores of the tubular members illustrated by FIGS. 4, 5, 6 and 8, which cross-section is of uniform size and shape throughout the lengths of the members 139.

When the strips of desired cross-sectional size and shape constituting the core members 139 are not commercially available the core members may be made by flattening, by a rolling operation, a tube 153 of circular cross-section indicated in FIG. 29 of requisite wall thickness to form the strip 155 of FIG. 27, or where a tube of requisite diameter to form a strip 155 of the desired width is not available the tube may be partially flattened until it has that desired width as indicated by the tubular core member 157 (FIG. 28). One end portion of the tubular member 157 may be completely flattened, as indicated at 159 (FIG. 30), either before or after the billet is formed, to render that end suitable for being gripped by the jaws of the instrumentality which pulls the member from the billet. If the end portion of the tube 157 is flattened completely prior to pouring the mold the tubular portion of the member adjacent the flattened portion is preferably formed with a small diameter opening 161 for venting the interior of the member during the casting operation.

It will be understood that after the billet is formed by use of the withdrawable core members the billet, after the core members are withdrawn, is substantially like that shown by FIGS. 22 and 23. The cored passages of such billet may be charged with weld preventing powder in the way hereinbefore described after closing the lower ends of said passages in the way hereinbefore described and illustrated by said figures, and after the billet is so charged the upper ends of the passages may be closed in the way hereinbefore described and illustrated by said figures.

It will be understood that in forming a billet suitable for use in producing the internally slitted strip the bodies of weld preventing material in the billet should ordinarily be rather thin. There is, however, a limit to such thinness when there are passages in the billet that are to be charged with powdered weld preventing material to form such bodies, it becoming increasingly difficult, especially when the billet is long, to so charge said passages as the thinness of those passages is decreased, and particularly when decreased to less than about 3/16 inch. It has been found, however, that for all billets of requisite length in commercial practice the core members, which will form in the billet passages of requisite size to enable them to be readily charged with powdered weld preventing material to form bodies of such powder that are of requisite thickness, may be successfully employed without stressing the core members to beyond their yield points when withdrawing them from the billet.

As an example of the practice of the invention by use of the elongated core members applicant has installed in a mold substantially like that according to FIG. 25 a row of spaced 3/16 inch thick by 1¼ inch wide strips according to FIG. 24 of stainless steel of the character above described, and, after coating the surfaces of the mold chamber and strips with mold dressing, poured the mold to form a copper billet 3½ feet long and 4 inches thick. After such billet was cast and cooled and removed from the mold he successfully pulled these core members from the billet by use of a machine analogous to a tensile testing machine, for strip metal, having jaws that engaged the portions of the strips projecting from the body portion of the billet, the billet being held stationary during such pulling operation. It was found that the force required to pull one of these strips from the billet was somewhat less than 50 pounds per square inch of surface area of the portions of the strips within the billet as cast.

It will be understood that within the scope of the appended claims wide deviations may be made from the forms of the invention herein described without departing from the spirit of the invention.

I claim:

1. The method of making metal strip of a metal of the group consisting of copper, copper base alloys, carbon steel, cupro-nickel containing approximately 20 to 30 percent nickel, and nickel base alloys such as Monel metal, such metal strip having between its opposite faces a plurality of slits extending lengthwise thereof in parallel relation to its opposite faces and edges, which slits widthwise thereof extend widthwise of the strip, comprising casting a relatively thick elongated billet in a vertical mold chamber by entering molten metal into such chamber from above and about a plurality of elongated, vertically positioned, smooth-walled strip-form metal members in such wise that said members project from at least one end of the casting so formed, said members being of flattened, such as oblong, transverse cross-section, which cross-section is of uniform size and shape throughout the portions of said members within the casting and is of requisite area relative to the mass of the casting to cause said members to be at substantially the temperature of the contiguous metal of the casting when such metal is at its solidus temperature, the metal of said members having a melting point higher than the pouring temperature of the metal of said casting, and having an average coefficient of thermal linear expansion greater than that of the metal of the casting for a temperature difference corresponding to the cooling of the billet from such solidus temperature to room temperature whereby to minimize the tightness of the fit of said members in the casting when the billet cools so as to permit withdrawal from the billet of said members lengthwise under forces less than those which will stress said members to their yield points; so withdrawing said members by pulling on their end portions projecting from the billet; filling with weld preventing material the passages in the billet left by such withdrawal of said members; and rolling the billet lengthwise of said passages to elongate the billet and thin it to the desired gauge of the strip and to move opposite faces of said passages substantially into contact.

2. The method according to claim 1 in which the metal of the elongated members is an austenitic stainless steel containing 16 to 20% chromium, 6 to 11% nickel, and 60 to 78% iron, and having an average coefficient of thermal linear expansion of at least about 10.6 microinches per inch per degree Fahrenheit for a temperature difference of room temperature to about 1825 degrees Fahrenheit.

3. The method according to claim 1 in which the metal of the elongated members is an alloy consisting of approximately 87% nickel, 10% silicon, and 3% copper.

4. The method according to claim 1 in which the elongated members are initially tubular and preparatory to positioning of them for pouring of the metal about them they are flattened to the external and cross-sectional size and shape as stated for said elongated members.

References Cited in the file of this patent

UNITED STATES PATENTS

| | | |
|---|---|---|
| 12,000 | Newman | Mar. 23, 1854 |
| 29,276 | Holmes | July 24, 1860 |
| 117,494 | Wheeler | July 25, 1871 |
| 377,316 | Marshall | Jan. 31, 1888 |
| 377,318 | Marshall | Jan. 31, 1888 |
| 1,516,153 | Gorman | Nov. 18, 1924 |
| 2,938,263 | Kruger | May 31, 1960 |
| 2,983,994 | Johnson | May 16, 1961 |

FOREIGN PATENTS

| | | |
|---|---|---|
| 205,695 | Australia | Jan. 10, 1957 |
| 421,424 | Great Britain | Dec. 20, 1934 |